United States Patent Office 3,450,686
Patented June 17, 1969

3,450,686
POLYMERIZATION OF ETHYLENE UTILIZING AN ORGANOPEROXYSILANE AS THE CATALYST
George A. Mortimer, La Marque, Tex., assignor to Monsanto Company, St. Louis, Mo., a corporation of Delaware
No Drawing. Continuation-in-part of application Ser. No. 324,238, Nov. 18, 1963. This application Dec. 31, 1964, Ser. No. 422,553
Int. Cl. C08f 1/60
U.S. Cl. 260—94.9                        9 Claims The present application is a continuation-in-part of copending application, Serial No. 324,238 filed November 18, 1963, now abandoned.

This invention relates to a process for the polymerization of ethylene. More particularly, it relates to the use of certain organoperoxy-silanes as novel initiators for the polymerization of ethylene at high pressures.

It is well known that ethylene can be polymerized at high pressures in the presence of free-radical-generating materials which serve as initiators for the reaction. At a rather constant free-radical concentration and over a narrow temperature range, the polymers made tend to have a narrow molecular weight distribution whereas similar polymers made over a wide temperature range will tend to have a broad molecular weight distribution. A narrow distribution is advantageous for some properties, for example, film optical quality. In a polymerization process, the dual requirements of narrow temperature range and rather constant free-radical concentration can be obtained only by polymerizing at a temperature at which the initiator decomposes to free radicals at a relatively slow rate. Since all initiators decompose more rapidly as the temperature is raised, there is obviously a temperature ceiling above which any initiator decomposes too rapidly and the molecular weight distribution is broadened.

Also, it is well established that the extent of branching of polyethylene increases as the polymerization temperature increases. Therefore, if a highly branched polymer of narrow molecular weight distribution is desired it is necessary to use an initiator which decomposes gradually at a very high temperature. All of the better known peroxide initiators, however, begin to function at temperatures below 140° C. The most widely used effective initiator for the polymerization of ethylene which begins to function at higher temperatures is oxygen which usually begins to function at temperatures in the range from about 160° C. to 230° C. However, the use of oxygen entails certain disadvantages in that it makes the reaction more difficult to control and is extremely inefficient at pressures below 15,000 p.s.i. The present invention provides new initiators which do not suffer from these disadvantages.

It is, therefore, an object of this invention to provide a process for the free-radical polymerization of olefinic monomers. A further object of this invention is to provide an initiator for the polymerization of ethylene which is effective at a higher range of temperatures than the commonly used peroxide initiators yet possesses the usual advantages of peroxide initiators. These and other objects and advantages of the invention will become apparent from the following description of the invention.

According to the invention, ethylene is polymerized at elevated temperatures and pressures in the presence of an organoperoxysilane having a half-life of about five hours at temperatures in the range from about 140° to 200° C. and, more particularly, an organoperoxysilane having a half-life of about five hours at temperatures from about 140° to about 155° C. The preferred organoperoxy-silane initiators of the invention defined above are compounds corresponding to the formula

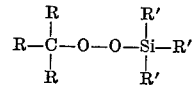

wherein each R is a hydrocarbon moiety independently selected from the group consisting of alkyl, cycloalkyl, aryl and aralkyl radicals and each R' is independently selected from the group consisting of alkyl, cycloalkyl, aryl and aralkyl radicals and a radical corresponding to the formula

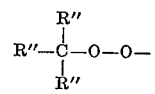

wherein each R" is independently selected from the group consisting of alkyl, cycloalkyl, aryl and aralkyl radicals. Exemplary of the alkyl, cycloalkyl, aryl and aralkyl radicals which can be present in these compounds are methyl, ethyl, propyl, butyl, pentyl, hexyl, cyclobutyl, cyclopentyl, cyclohexyl, menthyl, phenyl, tolyl, naphthyl, benzyl and the like. Preferably, the alkyl and cycloalkyl radicals contain from 1 to 6 carbon atoms and the aryl and aralkyl radicals contain from 6 to 12 carbon atoms; however, compounds in which these radicals contain a greater number of carbon atoms can be employed. Each of the R, R' and R" radicals may be the same or each of them may be different as desired.

The invention is illustrated in the following examples which, however, are not to be construed as limiting its scope in any manner.

Example 1

After careful purging of the steel bomb used as the polymerization reactor together with lines connected thereto to eliminate all traces of air or oxygen, the bomb was filled with ethylene and a small quantity of propane at an elevated temperature and atmospheric pressure. By means of a hypodermic needle a small amount of tert-butylperoxytrimethylsilane was injected into a compartment of the bomb in such a manner as to exclude all air or oxygen. Additional hot ethylene and propane were pumped into the bomb until the pressure reached approximately 7500 p.s.i. while the temperature was maintained above about 150° C. The mechanical agitator inside the bomb was started and the tert-butylperoxytrimethylsilane used as the polymerization initiator was forced into the bomb by means of high pressure ethylene. The bomb was then pressured by means of an ethylene pump to the final conditions of 20,000 p.s.i. and 185° C. The tert-butylperoxytrimethylsilane was present in a quantity equal to 0.165 millimoles per liter of reactor volume at 20,000 p.s.i. and the propane modifier made up 8.57 percent of the total charge to the reactor, the remainder being ethylene. After a reaction time of 39 minutes, a solid ethylene polymer having a melt index of 0.218 and a density of 0.929 was obtained. The rate of conversion of the ethylene to polymer was calculated to be 30.6 percent per hour.

Example 2

Following the procedure of Example 1 and using the identical reactor used in Example 1, ethylene and 8.57 mole percent propane as a modifier were subjected to polymerization conditions of 20,000 p.s.i. and 185° C. in the presence of 0.062 millimoles of tert-butylperoxytrimethylsilane per liter of reactor volume at 20,000 p.s.i. After a reaction time of 19.5 minutes, an ethylene polymer was recovered which had a melt index of 0.741 and a density of 0.928. The number average molecular weight was found by osmometry to be 33,900 and the intrinsic viscosity was found to be 1.020 at 105° C. in para-xylene. The rate of conversion was calculated to be 15.5 percent per hour.

Example 3

A feed stream consisting of 88.63 percent ethylene with 11.21 percent propane as a modifier was charged to the reactor of Example 1 and the ethylene therein was polymerized following the same general procedure described in that example. Di-tert-butylperoxydimethylsilane in an amount equal to $4.1 \times 10^{-5}$ moles/liter was employed as the initiator with the pressure being maintained at 20,000 p.s.i. and the temperature at 167° C. over a reaction period of about 20 minutes. Polyethylene having a melt index of 2.3 was obtained. Rate of conversion of ethylene to polymer was calculated to be 18.7 percent per hour.

Example 4

Ethylene containing 13.64 percent propane as a modifier was polymerized as in Examples 1–3 above using $2.1 \times 10^{-4}$ mole/liter of di-tert-butylperoxydiphenylsilane as initiator at a temperature of 146° C. and a pressure of 20,000 p.s.i. At the end of the 36-minute polymerization run, conversion to polymer having a melt index of 1.0 was 10.4%.

Many variations can be made in materials and conditions from those given in the examples without departing from the scope of the invention. In addition to the organoperoxysilanes exemplified, for example, any of the organoperoxysilanes corresponding to the formula set out above can be used. Suitable compounds include, for example, cumylperoxytrimethylsilane, p-methylperoxytrimethylsilane, tert-butylperoxytriethylsilane, tert-butylperoxytriphenylsilane, tri(tert-butylperoxy)methylsilane, tetra(tert-butylperoxy)silane, di(tert-butylperoxy)methylphenylsilane, tri(tert-butylperoxy)phenylsilane, di(tert-butylperoxy)diethylsilane, tri(tert-butylperoxy)ethylsilane, tri(tert-butylperoxy)benzylsilane, tri(tert-butylperoxy)naphthylsilane, tri(tert-butylperoxy)cyclohexylsilane, tert-amylperoxytrimethylsilane, 2-phenyl-2-propylperoxytrimethylsilane, etc., and mixtures thereof.

The organoperoxysilane initiators of the invention when not commercially available can be prepared by reacting a suitable halosilane (e.g., diethyldifluorosilane, ethyltrifluorosilane, tetrafluorosilane, trimethylchlorosilane, triphenylchlorosilane, ditolyldichlorosilane, naphthyltrifluorosilane, dicyclohexyldichlorosilane, benzyltrichorosilane, ethylisobutylbenzylchlorosilane, etc.) with a suitable organic hydroperoxide or mixture of organic hydroperoxides in the presence of a hydrogen halide acceptor such as ammonia or an amine in a solvent such as ether, etc., essentially in accordance with the equation:

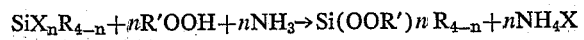

wherein X represents a halogen (i.e., F, Cl, Br or I), R and R' represent alkyl, cycloalkyl, aryl, or aralkyl radicals, and $n$ is an integer from 1 to 4.

The amount of the organoperoxysilane initiator used depends to some extent on the polymer desired which, in turn, depends upon the particular conditions of temperature and pressure employed. Generally, amounts of initiator in the range from about $5 \times 10^{-6}$ to $5 \times 10^{-2}$ mole per liter are used. Preferably, about $5 \times 10^{-4}$ moles per liter is used.

The temperature of the polymerization reaction may vary anywhere in the broad range from about 100° C. to about 400° C. and preferably is maintained from about 140° to about 350° C. For continuous tubular or autoclave processes, temperatures from about 175° C. to about 400° C. are employed with those in the range from about 225° C. to about 350° C. being preferred. Batch-type processes which usually require slightly lower temperatures can be conducted advantageously at temperatures from about 100° C. to about 250° C. with preferred temperatures being those in the range from about 140° C. to about 200° C.

Polymerization pressure like polymerization temperature may vary widely depending upon the particular type of polymer desired. Generally, pressures in the range from 5,000 to 50,000 p.s.i. are employed and those from 8,000 to 40,000 are preferred.

Of special importance is the use of the organoperoxysilanes of this invention in combination with oxygen or a peroxygen compound to provide a mixed initiator having tailored properties. Of the peroxygen compounds applicable to such utilization, the following are particularly suitable: hydrogen peroxide; dialkyl peroxides such as diethyl peroxide and di-tert-butyl peroxide; butyryl peroxide; lauroyl peroxide; benzoyl peroxide; alkylhydroperoxides; diperoxy dicarbonate esters; tert-alkyl percarboxylates such as tert-butyl perbenzoate; and potassium persulfate.

The continuous operation, which is the preferred method for conducting the polymerization, may be carried out in either a tubular reactor or an autoclave reactor, either at variable pressure with a let-down kick or at constant pressure. Conversions are only limited by the procedure used and by the heat transfer capabilities of the equipment. Whereas it is preferable to limit conversions to about 20% in the continuous, tubular reactor, conversions of 30% per pass and greater can be obtained in a continuous constant pressure process in tubular reactors at high linear flow rates as well as in the batch process exemplified.

Not only homopolymers may be prepared using the organoperoxysilanes of this invention as initiators, but ethylene may be copolymerized as well with other polymerizable compounds using this initiator. Suitable comonomers include, for example, vinyl and vinylidene hydrocarbons having from 3 to 8 carbon atoms, such as propylene, butene, isobutylene, and other olefins and isoolefins; halogen substituted hydrocarbons such as vinyl chloride, vinyl fluoride, vinylidene chloride, vinylidene fluoride, 1,1-chlorofluoroethylene, etc.; vinyl esters such as vinyl acetate, vinyl butyrate, vinyl propionate; vinyl ethers including vinyl methyl ether, vinyl ethyl ether, vinyl octyl ether, and the like; acrylic acid, acrylonitrile, acrylic esters including methyl, ethyl, propyl, etc., acrylates; acrylamide; α-substituted acrylic acids, nitriles, esters, and amides such as methacrylic acid, methacrylonitrile, methyl methacrylate, ethyl methacrylate, methacrylamide, etc.; the acids, esters, and amides of a α,β-ethylenically unsaturated dicarboxylic acid such as fumaric, maleic, citraconic, itaconic, etc., and the like. If a copolymer is prepared by the process of this invention, it should contain more than 50% by weight of ethylene.

What is claimed is:

1. A process for producing normally solid ethylene polymers which comprises polymerizing ethylene at temperatures from about 140° to about 350° C. and pressures from about 5,000 to about 50,000 p.s.i. in the presence of an amount sufficient to initiate said polymerization of an organoperoxysilane of the formula

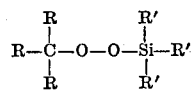

wherein R is a hydrocarbon moiety selected from the group consisting of alkyl, cycloalkyl, aryl and aralkyl radicals and R' is selected from the group consisting or alkyl, cycloalkyl, aryl and aralkyl radicals and a radical corresponding to the formula

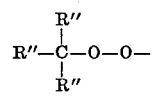

wherein R" is selected from the group consisting of alkyl, cycloalkyl, aryl and aralkyl radicals.

2. The process of claim 1 wherein the amount of said organoperoxysilane is in the range from about $5\times10^{-6}$ to $5\times10^{-2}$ moles per liter of reaction feed material.

3. A process for producing normally solid ethylene polymers which comprises polymerizing ethylene at temperatures from about 140° to about 350° C. and pressures from about 5,000 to about 50,000 p.s.i. in the presence of an initiator for said polymerization comprising a mixture of a compound selected from the group consisting of oxygen and peroxygen compounds and an organoperoxysilane of the formula

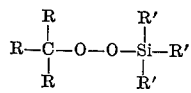

wherein R is a hydrocarbon moiety selected from the group consisting of alkyl, cycloalkyl, aryl and aralkyl radicals and R' is selected from the group consisting of alkyl, cycloalkyl, aryl and aralkyl radicals and a radical corresponding to the formula

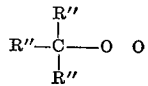

wherein R" is selected from the group consisting of alkyl, cycloalkyl, aryl and aralkyl radicals.

4. A process for producing polyethylene which comprises polymerizing ethylene at a temperature in the range from about 140° to about 350° C. and a pressure from about 8,000 to about 40,000 p.s.i. in the presence of an amount of tert-butylperoxytrimethylsilane sufficient to initiate said polymerization.

5. The process of claim 4 wherein the amount of said tert-butylperoxytrimethylsilane initiator is in the range from about $5\times10^{-6}$ to about $5\times10^{-2}$ moles per liter of reaction feed material.

6. A process for producing polyethylene which comprises polymerizing ethylene at a temperature from about 140° to about 350° C. and a pressure of 8,000 to about 40,000 p.s.i. in the presence of an amount of di-tert-butylperoxydimethylsilane sufficient to initiate said polymerization.

7. The process of claim 6 wherein the amount of said di-tert-butylperoxydimethylsilane initiator is in the range from about $5\times10^{-6}$ to about $5\times10^{-2}$ moles per liter of reaction feed material.

8. A process for producing polyethylene which comprises polymerizing ethylene at a temperature from about 140° to about 350° C. and a pressure of 8,000 to about 40,000 p.s.i. in the presence of an amount of di-tert-butylperoxydiphenylsilane sufficient to initiate said polymerization.

9. The process of claim 8 wherein the amount of said di-tert-butylperoxydiphenylsilane initiator is in the range from about $5\times10^{-6}$ to about $5\times10^{-2}$ moles per liter of reaction feed material.

References Cited

UNITED STATES PATENTS

| 2,997,497 | 8/1961 | Jenker et al. | 260—448.8 |
| 2,692,887 | 10/1954 | Berry | 260—448.2 |

FOREIGN PATENTS

| 827,366 | 2/1960 | Great Britain. |
| 1,030,345 | 5/1958 | Germany. |

OTHER REFERENCES

Buncel et al., J. Chem. Soc. (London), 1958, pp. 1550–1556.

Hahn et al., Die Makromolekulare Chemie, 22, 113 (1956), pp. 113–120.

JAMES A. SEIDLECK, *Primary Examiner.*

U.S. Cl. X.R

260—78.5, 86.7, 87.3, 87.5, 87.7, 88.1, 88.2, 448.2, 424—177